US012697264B2

(12) United States Patent
Li et al.

(10) Patent No.: US 12,697,264 B2
(45) Date of Patent: Aug. 4, 2026

(54) LOCKING AND A FIXING DEVICE FOR AN ECMO CARRYING STAND

(71) Applicant: Lifemotion Medical Technology Co., Ltd., Shenzhen (CN)

(72) Inventors: Yijiang Li, Shenzhen (CN); Gaojian Liu, Shenzhen (CN); Yang Liu, Shenzhen (CN); Mingtao Li, Shenzhen (CN)

(73) Assignee: Lifemotion Medical Technology Co., Ltd., Shenzhen (CN)

( * ) Notice: Subject to any disclaimer, the term of this patent is extended or adjusted under 35 U.S.C. 154(b) by 55 days.

(21) Appl. No.: 18/968,971

(22) Filed: Dec. 4, 2024

(65) Prior Publication Data

US 2025/0177226 A1 Jun. 5, 2025

(30) Foreign Application Priority Data

Dec. 5, 2023 (CN) ........................ 202311656550.4

(51) Int. Cl.
*F16M 11/00* (2006.01)
*A61G 12/00* (2006.01)

(52) U.S. Cl.
CPC .................................... *A61G 12/00* (2013.01)

(58) Field of Classification Search
CPC ........ A61G 12/00; A61G 13/101; A61G 1/04; A61G 3/001; A61G 7/0503; A61G 2203/78; A61M 1/1698; A61M 16/1005; A61M 2202/0208; A61M 2209/082
See application file for complete search history.

(56) References Cited

U.S. PATENT DOCUMENTS

| | | | | |
|---|---|---|---|---|
| 11,103,407 | B2 | 8/2021 | Zahynacz | |
| 11,363,895 | B2 * | 6/2022 | Schuft | A47F 7/0246 |
| 11,981,264 | B2 * | 5/2024 | Rego | B60R 11/02 |
| 12,372,196 | B2 * | 7/2025 | Roth | E05B 15/0053 |
| 2010/0079285 | A1 * | 4/2010 | Fawcett | E05B 73/0082 70/57.1 |
| 2015/0313026 | A1 * | 10/2015 | Yu | G06F 1/1626 248/287.1 |

OTHER PUBLICATIONS

Extended European Search Report issued in European Patent Application No. 24217916.6, dated May 9, 2025.

* cited by examiner

*Primary Examiner* — Amy J. Sterling
(74) *Attorney, Agent, or Firm* — Nelson Mullins Riley & Scarborough LLP

(57) ABSTRACT

The embodiment of the present application provides a locking device and a fixing device, including a hook assembly and a trigger assembly. The hook assembly includes a sliding member, a first hook and a second hook. The first hook and the second hook are arranged on the sliding member at intervals. The sliding member is slidably connected to the base, and an adjustment assembly is arranged between the sliding member and the base. The trigger assembly includes a trigger assembly body and a mounting member. The trigger assembly body is arranged on the mounting member. The trigger assembly body is arranged above the first hook, and the device to be fixed drives the trigger assembly body to move and then drives the sliding member to move.

14 Claims, 6 Drawing Sheets

LOCKING AND A FIXING DEVICE FOR AN ECMO CARRYING STAND

CROSS REFERENCE TO RELATED APPLICATION

The present application claims priority to Chinese Patent Application No. 202311656550.4, filed Dec. 5, 2023, the entire disclosure which is hereby incorporated by referenced.

TECHNICAL FIELD

The embodiments of this application belong to the field of medical devices, and specifically relate to a locking device and a fixing device.

BACKGROUND

Extracorporeal membrane oxygenation (ECMO) is used to treat patients with cardiopulmonary failure. In order to ensure that the ECMO system or host can be placed safely and reliably on a mobile cart or other placement platform without causing a large shake or even falling due to accidental contact, the ECMO system or host needs to be fixed on the placement platform. At the same time, due to the high reliability requirements of medical equipment, some existing medical equipment is often fixed by bolts or other complex but reliable methods, such as the fixation of ECMO in patents CN213075932U and CN115670831A. ECMO is often used in the field of emergency treatment, and every second is precious.

Since the ECMO host is heavy after being equipped with consumables, it requires both hands to be taken out. However, a fixing mechanism in the prior art requires both hands to operate when the ECMO system or host is unlocked. One hand is required to operate the locking release mechanism and keep it in the released state, and the other hand is required to take out the ECMO system or host. The operation is cumbersome, and when one hand operates the locking release mechanism and keeps it in the released state, it may occasionally not be released in place. At this time, the ECMO system or host may still be stuck. For example, patent CN218607555U, while meeting the reliability and convenient installation requirements, is such a situation. When unlocking, it is necessary to press the grip with your hand or step on the grip with your foot. When one foot is stepped on, sliding backward to unlock is extremely inconvenient and there is even a risk of falling. In addition, the host device cannot be smoothly taken out if the unlocking is not pressed in place.

There is also another one-handed locking method, which is a toggle-type locking mechanism. However, there is a possibility that the host is forgotten to be locked after being placed in. If the system is accidentally impacted during transportation or use, there is a risk of tipping over and falling. Or if it is not reset after unlocking, the host device cannot be placed in.

After the ECMO system host is equipped with consumables, the fixed installation and unlocking of the entire ECMO system host should avoid touching the consumables and pulling the pipelines. The existing ECMO usually sets the consumables in the middle area above the bottom frame and under the handle. Therefore, the location setting and unlocking method of the unlocking device should also be very important, and it is necessary to avoid touching the consumables while ensuring convenience.

SUMMARY

In order to solve or alleviate the problems existing in the prior art, in a first aspect, the present application provides a locking device, including a hook assembly and a trigger assembly.

The hook assembly comprises a sliding member, a first hook, a second hook and a base, the first hook and the second hook are arranged on the sliding member at intervals, the sliding member is slidably arranged on the base, and an adjustment assembly is arranged between the sliding member and the base.

When the device to be fixed drives the first hook to drive the sliding member to move toward the second hook, the sliding member and the base move relative to each other, and the adjustment assembly drives the sliding member to move toward the device to be fixed, so that the device to be fixed is fixed by the first hook.

The trigger assembly includes a trigger assembly body and a mounting member. The trigger assembly body is arranged on the mounting member, and the mounting member is arranged on the base. The trigger assembly body is movably sleeved above the first hook, and the trigger assembly body is driven to move by the fixing device to limit the sliding piece.

Furthermore, the adjustment assembly includes a first elastic member, a first through hole is provided on the sliding member, a groove is provided at a position on the base corresponding to the first through hole, and the first elastic member is provided in the through hole and the groove.

Furthermore, when the first hook is driven by the device to be fixed to drive the sliding member to move toward the second hook, an end of the first elastic member close to the first hook abuts against the sliding member and does not abut against the base; an end of the first elastic member away from the first hook does not abut against the sliding member, and abuts against an end of the base away from the first hook.

Furthermore, the trigger assembly body includes a trigger member and a movable member, the trigger member and the movable member are hinged, the mounting member is movably sleeved above the first hook, a second through hole is provided on the mounting member, a movable member is movably provided inside the second through hole, the movable member matches the second through hole, a second elastic member is provided on the periphery of the movable member, and the trigger member is driven by the device to be fixed to cause the second elastic member to undergo elastic deformation.

A limit block is provided on the side of the first hook close to the second hook.

The device to be fixed drives the trigger member to move and then drives the movable member to move until the limit block restricts the movable member from further moving.

When the device to be fixed is not in contact with the trigger member, the second elastic member drives the movable member to reset the trigger member.

Furthermore, the trigger member is a lever, and the movable angle of the lever on the upper end surface of the mounting member is less than 90 degrees.

Furthermore, a trigger portion is provided on the side of the first hook and the second hook facing the device to be fixed.

Furthermore, the trigger portion is a beveled surface.

Furthermore, the first hook and the second hook are both provided with an inverted L-shaped groove below the trigger portion, and when the device to be fixed is in a locked state, the part to be fixed is arranged in the inverted L-shaped groove.

Furthermore, a shielding member is provided at the upper end of the trigger assembly body, and a notch corresponding to the position of the L-shaped groove is formed on the shielding member.

In a second aspect, the present application provides a fixing device, comprising a plurality of locking devices arranged at intervals, wherein the locking devices are arranged between a device to be fixed and a support member.

The embodiment of the present application provides a double hook, a first hook and a second hook, and the double hooks are provided one in front of the other in a direction perpendicular to the pressing surface, so that the device to be fixed can be fixed more securely. By providing a trigger assembly above the first hook and an adjustment assembly between the sliding member and the base, the trigger assembly cooperates with the adjustment assembly, and when the device to be fixed is fixed, the device to be fixed can be automatically locked without other operations; when unlocking, it can be in place at one time, and there is no situation where it is not released in place. When it is released in place, the other hand can be released to assist in extracting the device to be fixed, so that the trigger assembly will clamp the first hook, and the reliability during the removal of the device to be fixed is increased; after unlocking, the trigger assembly will clamp the first hook, and there is no need to perform reset and other operations.

BRIEF DESCRIPTION OF THE DRAWINGS

The drawings described here are used to provide a further understanding of the present application and constitute a part of the present application. The schematic embodiments of the present application and their descriptions are used to explain the present application and do not constitute an improper limitation of the present application. The following text will describe some specific embodiments of the present application in detail in an exemplary and non-restrictive manner with reference to the accompanying drawings. The same figure marks in the accompanying drawings indicate the same or similar components or parts. It should be understood by those skilled in the art that these drawings are not necessarily drawn to scale. In the accompanying drawings.

In the figure: 100, hook assembly; 110, sliding member; 111, first hook; 112, second hook; 113, base; 114, first elastic member; 115, first through hole; 116, groove; 200, trigger assembly; 210, mounting member; 220, trigger member; 221, movable member; 222, second through hole; 223, second elastic member; 224, limit block; 225, shielding member; 230, trigger portion; 300, support member; 310, fixing block; 400, device to be fixed.

DETAILED DESCRIPTION

In order to make the technical personnel in this technical field better understand the scheme of this application, the technical scheme in the embodiment of this application will be clearly and completely described in combination with the drawings in the embodiment of this application. The described embodiment is only a part of the embodiment of this application, not all of the embodiments. Based on the embodiments in this application, other embodiments obtained by ordinary technicians in this field without making creative work should belong to the scope of protection of this application.

The locking device of the present application is applied to the field of ECMO (extracorporeal membrane oxygenation) but is not limited to the field of ECMO (extracorporeal membrane oxygenation). ECMO is an important technology for maintaining the cardiopulmonary function of patients. ECMO extracts blood from the body's circulation, oxygenates it, and then transports it back to the body to replace damaged lung or heart function.

The ECMO system includes an oxygenator, a pump and a main unit, which usually need to be placed on a mobile cart (refer to patent CN215504695U). A bracket (i.e., support member 300) is provided on the mobile cart, and the locking mechanism is provided on the bracket (i.e., support member 300); the main unit needs to be installed on a mounting frame (i.e., device to be fixed 400) (refer to patent CN111701102B), and then the mounting frame (i.e., device to be fixed 400) is connected to the bracket (i.e., support member 300) through the locking device of the present application, so that the main unit is installed on the cart, so that the main unit can be placed safely and reliably on the mobile cart or other placement platform, and will not shake significantly or even fall when accidentally touched.

Figure 1:
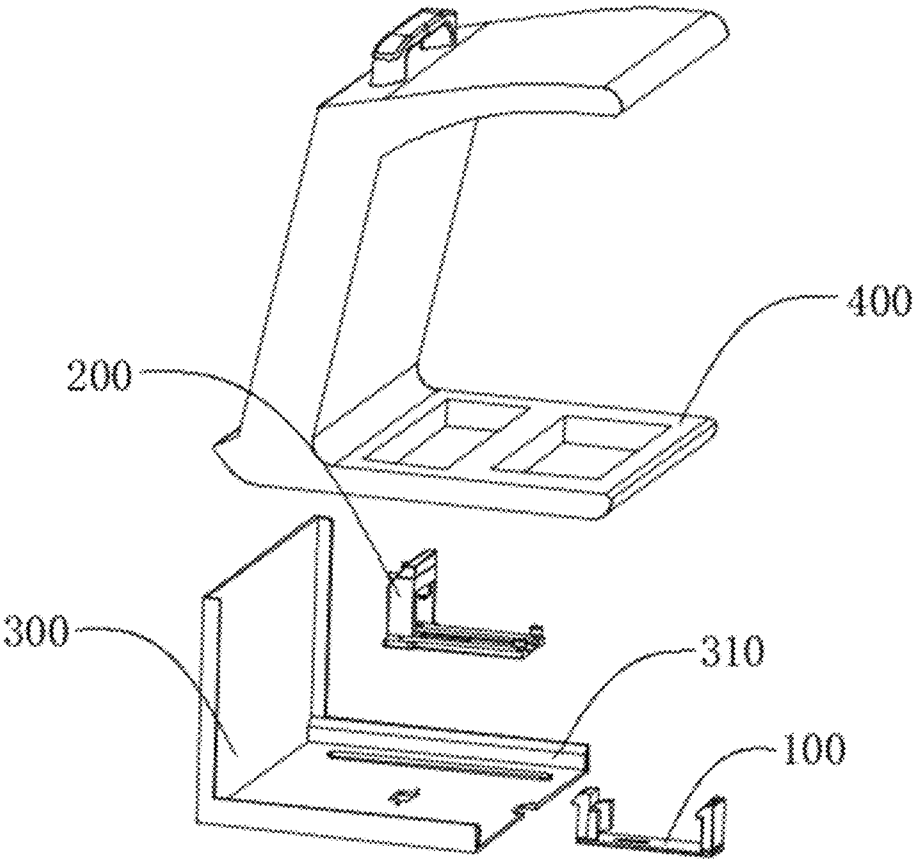
FIG. 1 is an exploded view of a fixing device according to an embodiment of the present application.
Figure 2:
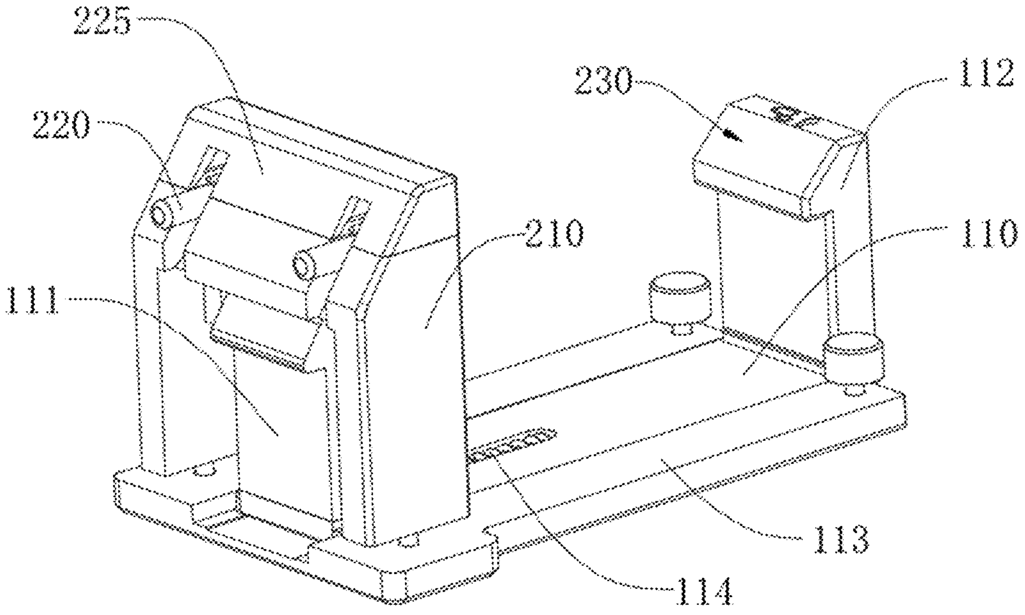
FIG. 2 is a schematic diagram of the structure of the locking device according to an embodiment of the present application.
Figure 3:
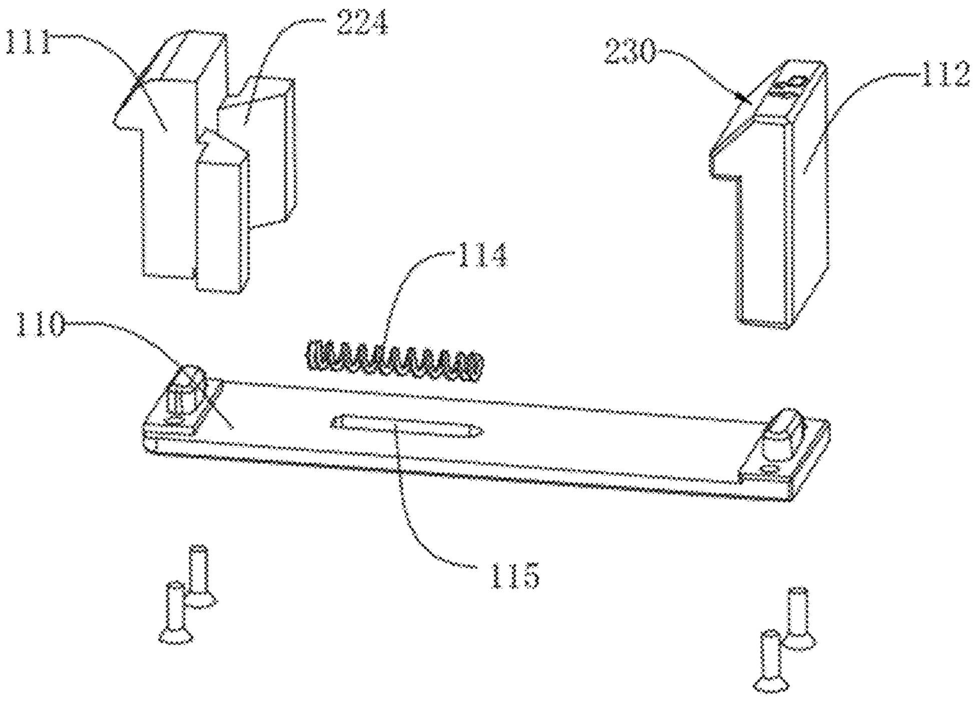
FIG. 3 is a schematic diagram of the structure of a hook assembly according to an embodiment of the present application.

As shown in FIGS. 1-3, in a first aspect, an embodiment of the present application provides a locking device, including a hook assembly 100 and a trigger assembly 200.

The hook assembly 100 includes a sliding member 110, a first hook 111, a second hook 112 and a base 113. The first hook 111 and the second hook 112 are arranged on the sliding member 110 at intervals. The sliding member 110 is slidably connected to the base 113. An adjustment assembly is arranged between the sliding member 110 and the base 113.

When the first hook 111 is driven by the device to be fixed 400 to drive the sliding member 110 to move toward the second hook 112, the sliding member 110 and the base 113 move relative to each other. At this time, the adjustment assembly drives the sliding member 110 to move toward the device to be fixed 400, so that the device to be fixed 400 is fixed by the first hook 111.

The trigger assembly 200 includes a trigger assembly 200 body and a mounting member 210. The trigger assembly 200 body is arranged on the mounting member 210, and the mounting member 210 is arranged on the base 113. The trigger assembly 200 body is movably sleeved above the first hook 111, and the trigger assembly 200 body is driven to move by the fixing device 400 to limit the sliding member 110.

In this embodiment, by setting the first hook 111 and the second hook 112, the positional relationship when they are locked one in front, and one behind can make the device to be fixed 400 more secure. By setting the trigger assembly 200 above the first hook 111 and setting the adjustment assembly between the sliding member 110 and the base 113, the trigger assembly 200 cooperates with the adjustment assembly, and when the device to be fixed 400 is fixed, the device to be fixed 400 can be automatically locked without other operations.

Through the cooperation between the trigger assembly 200 and the adjustment assembly, unlocking can be achieved in one go. When released in place, the other hand can be freed to assist in extracting the device to be fixed 400, so that the device to be fixed 400 can be taken out more smoothly, and the reliability during the removal of the device to be fixed 400 is increased; after unlocking, the trigger assembly 200 will lock the first hook 111, and there is no need to perform a reset operation.

In one embodiment, the bottom of the device to be fixed 400 is provided with a clamping portion corresponding to the positions of the first hook 111 and the second hook 112. In certain embodiments, the clamping portion is a regular polygonal frame structure, and the first hook 111 and the second hook 112 pass through the frame structure and are clamped to the edge of the frame structure.

In one embodiment, the adjustment assembly includes a first elastic member 114, a through hole 115 is provided on the sliding member 110, a groove 116 is provided at a position corresponding to the first through hole 115 on the base 113, and the first elastic member 114 is provided in the through hole 115 and the groove 116.

In this embodiment, when the first hook 111 is driven by the device to be fixed 400 to drive the sliding member 110 to move toward the second hook 112, the relative movement of the sliding member 110 and the base 113 causes the first elastic member 114 to be elastically deformed. When the device to be fixed 400 is fixed by the first hook 111, the elastic force of the first elastic member 114 drives the sliding member 110 to move toward the device to be fixed 400 to lock the device to be fixed 400, so that the first hook 111 and the second hook 112 are not easy to disengage, thereby achieving the purpose of firmly locking the device to be fixed 400. In certain embodiments, the first elastic member 114 is a spring.

In one embodiment, when the first hook 111 is driven by the fixing device 400 to drive the sliding member 110 to move toward the second hook 112, the end of the first elastic member 114 close to the first hook 111 abuts against the sliding member 110 and does not abut against the base 113; the end of the first elastic member 114 away from the first hook 111 does not abut against the sliding member 110, and abuts against the end of the base 113 away from the first hook 111. In this embodiment, when the sliding member 110 and the base 113 move relative to each other, the end of the first elastic member 114 away from the first hook 111 will be separated from the inner wall of the first through hole 115 of the sliding member 110 away from the first hook 111, but will always be in contact with the inner wall of the groove 116 away from the first hook 111, so that the first elastic member 114 will be compressed and produce elastic deformation.

In one embodiment, the first hook 111 and the second hook 112 are both provided with an inverted L-shaped groove below the trigger portion 230, and when the device to be fixed 400 is in a locked state, the part to be fixed is arranged in the inverted L-shaped groove. In this embodiment, since the relative positions of the first hook 111 and the second hook 112 are fixed, the first hook 111 can be moved backward by pulling the second hook 112. At this time, the first elastic member 114 is extended so that the limit block is stuck in the L-shaped groove of the first hook 111. When the first elastic member 114 is not retracted, the first hook 111 will be stuck.

Figure 4:
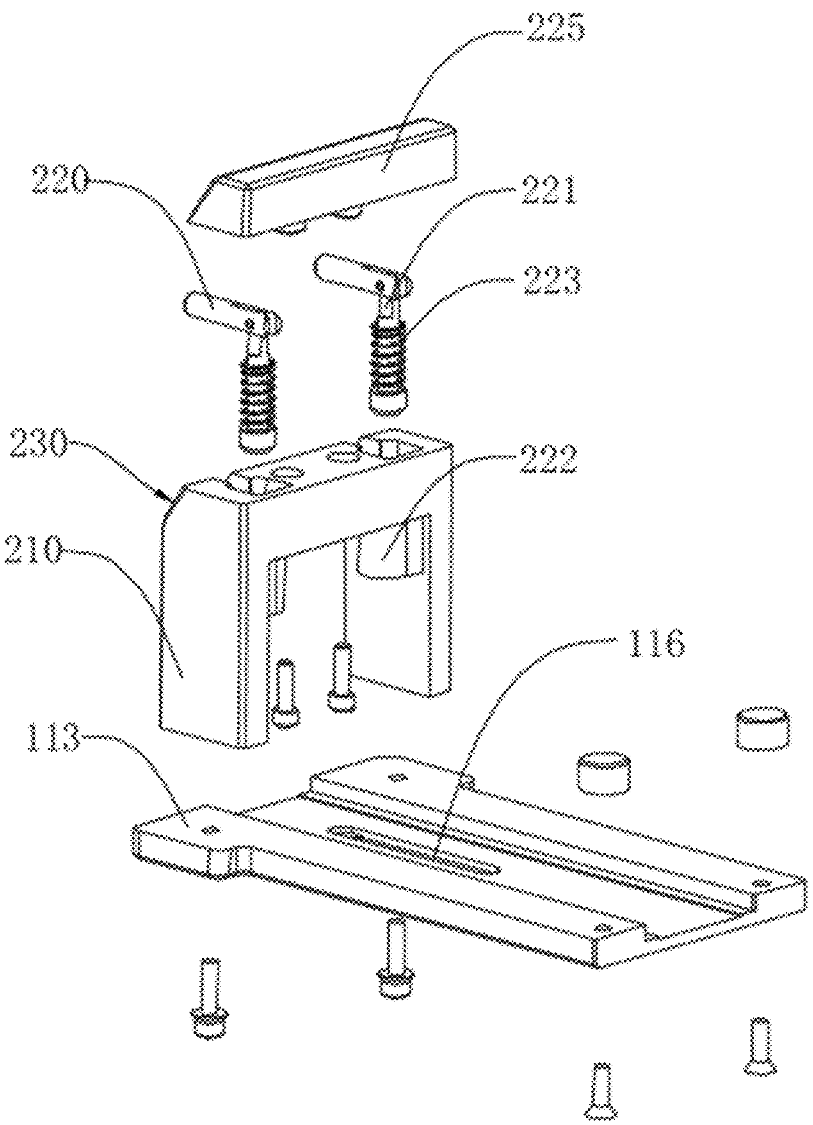
FIG. 4 is a schematic diagram of the trigger assembly structure of an embodiment of the present application.

As shown in FIG. 4, in one embodiment, the trigger assembly body includes a trigger member 220 and a movable member 221, the trigger member 220 and the movable member 221 are hinged, the mounting member 210 is movably sleeved above the first hook 111, the mounting member 210 is provided with a second through hole 222, the movable member 221 is movably provided inside the second through hole 222, the movable member 221 matches the second through hole 222, a second elastic member 223 is provided on the periphery of the movable member 221, and the trigger member 220 is driven by the device to be fixed 400 to cause the second elastic member 223 to undergo elastic deformation.

A limit block 224 is provided on the side of the first hook 111 facing to the second hook 112. The trigger member 220 is driven to move by the device to be fixed 400, thereby driving the movable member 221 to move until the limit block 224 restricts the movable member 221 from further moving. When the device to be fixed 400 is not in contact with the trigger member 220, the second elastic member 223 drives the movable member 221 to drive the trigger member 220 to reset.

In this embodiment, when the device to be fixed 400 needs to be fixed, after the device to be fixed 400 contacts the trigger member 220, the trigger member 220 drives the movable member 221 to rise, and the second elastic member 223 is compressed. At this time, the limit block 224 on the first hook 111 is separated from the movable member 221, and then the first elastic member 114 drives the sliding plate to slide toward the first hook 111, so that the first hook 111 is close to the device to be fixed 400 to fix the device to be fixed 400, and the lower end of the movable member 221 abuts against the upper end of the limit block 224.

When the device to be fixed 400 needs to be unlocked, the second hook 112 is pulled away from the first hook 111. At this time, the first elastic member 114 is elastically deformed, and the first hook 111 is separated from the device to be fixed 400. At the same time, the lower end of the movable member 221 is also separated from the limit block 224. After the movable member 221 is separated from the limit block 224, the movable member 221 is moved down to block the limit block 224 under the action of the second elastic member 223. At the same time, the first hook 111 is also stuck by the movable member 221. At this time, there is no need to control the second hook 112 by hand, and the device to be fixed 400 can be easily removed. When it needs to be fixed again, the operation is repeated.

The size of the movable member 221 matches that of the second through hole 222 in order to improve the stability of the movable member 221 during movement, and also to prevent the risk of the movable member 221 being detached due to the excessive diameter of the second through hole 222.

In one embodiment, the trigger assembly body is provided in several groups. In this embodiment, multiple groups of trigger assembly bodies are provided so that when the device 400 to be fixed is taken out, as long as any group of movable members 221 blocks the first hook 111, the device 400 to be fixed can be taken out smoothly, thereby enhancing reliability and convenience of operation. In certain embodiments, the number of trigger assembly bodies is set to two groups.

Figure 5:
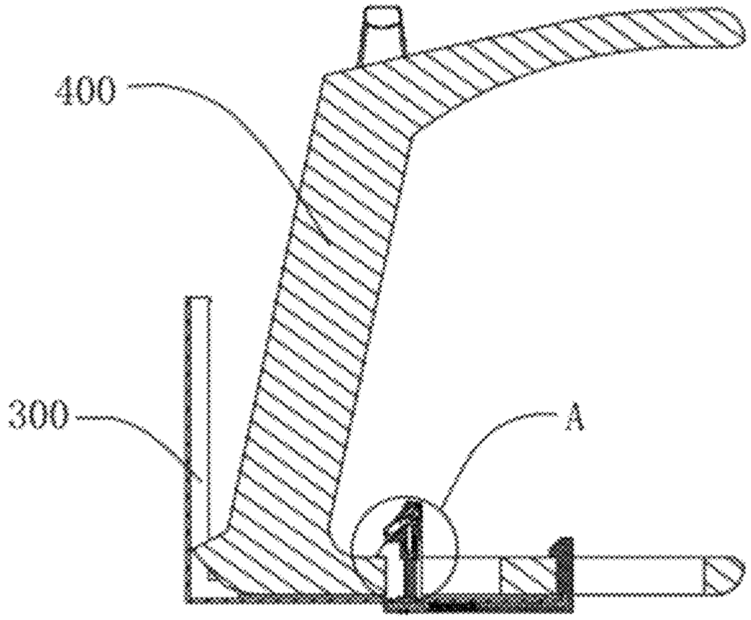
FIG. 5 is a schematic diagram of the cross-sectional structure of the fixing device of the embodiment of the present application when locked.
Figure 6:
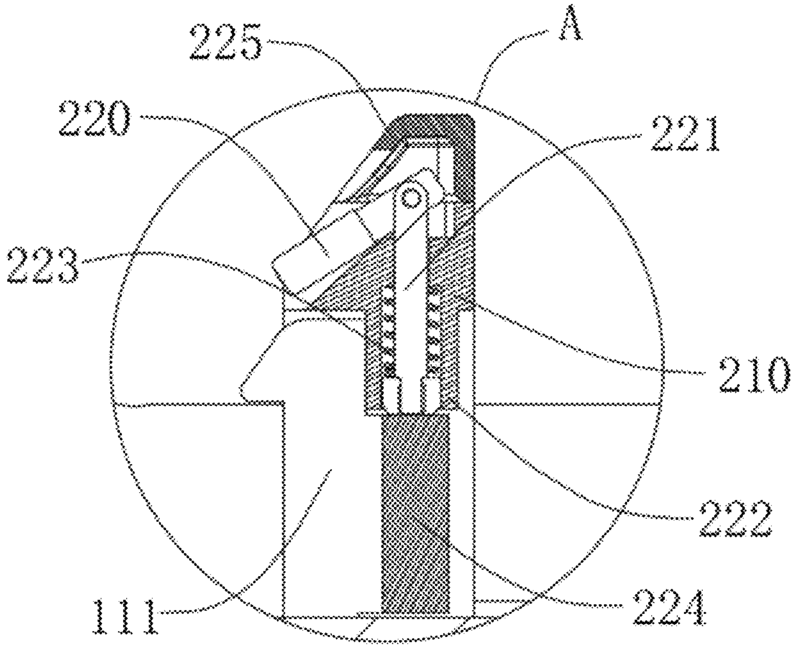
FIG. 6 is an enlarged view of the structure at point A in FIG. 5 of the embodiment of the present application.

As shown in FIGS. 5-6, in one embodiment, the trigger member 220 is a lever, and the movable angle of the lever on the upper end surface of the mounting member 210 is less than 90 degrees. In this embodiment, the movable angle of the lever on the upper end surface of the mounting member 210 needs to be less than 90 degrees, in order to prevent the lever and the movable member from being separated from the through hole of the mounting member 210 under the action of the second elastic member 223, causing the trigger assembly 200 to fail to operate normally.

In one embodiment, a shielding member 225 is disposed at the upper end of the main body of the trigger assembly 200, and a notch corresponding to the position of the L-shaped groove is formed on the shielding member 225. In this embodiment, a shielding member 225 is provided at the upper end of the trigger assembly 200, so as to prevent the trigger member 220 and the mounting member 210 from separating from the second through hole 222 of the mounting member 210 by making the angle between the trigger member 220 and the mounting member 210 not exceed 90 degrees; at the same time, the notch provided by the shielding member 225 also has a guiding effect on the trigger member 220.

In one embodiment, a trigger portion 230 is disposed on the first hook 111 and the second hook 112 facing the device to be fixed 400. In this embodiment, by providing a trigger portion 230 on the first hook 111 and the second hook 112 facing the device 400 to be fixed, it is possible to avoid the situation where both trigger portions 230 need to contact at the same time to lock. This arrangement makes the process of inserting and locking smoother.

In one embodiment, the trigger portion 230 is a beveled surface. In this embodiment, the trigger portion 230 is set as a beveled surface, which can make the device to be fixed 400 easier to trigger. At the same time, the structure of the beveled surface can also guide and position the device to be fixed 400.

In one embodiment, a smooth portion is disposed at the connection between the trigger portion 230 and the upper end surface of the first hook 111. In this embodiment, a smooth portion is provided at the connection between the trigger portion 230 and the upper end surface of the first hook 111. On the one hand, it is to make the triggering of the device to be fixed 400 smoother, and on the other hand, it is to make the movement of the trigger member 220 and the movable member 221 smoother. At the same time, the smooth structure will not cause wear to the trigger member 220, thereby further improving the service life.

In a second aspect, an embodiment of the present application provides a fixing device, comprising a plurality of locking devices arranged at intervals, wherein the locking devices are arranged between a support member 300 and a device to be fixed 400.

In one embodiment, the second hook 112 is located on the outer edge of the support member 300. In this embodiment, since the second hook 112 is located at the outer edge, it is more convenient to pull the second hook 112. Combined with the above description, the first hook 111 can be pulled out synchronously by pulling the second hook 112 more conveniently to unlock the door.

Figure 7:
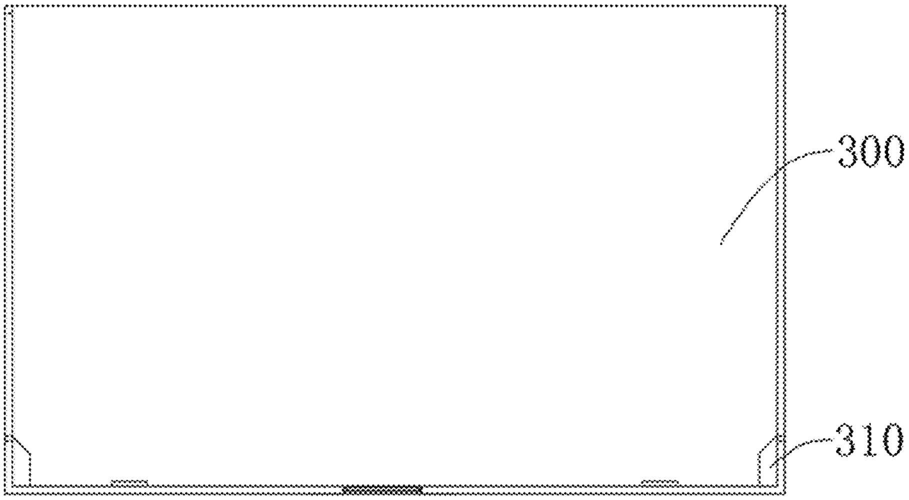
FIG. 7 is a front view of the support structure according to an embodiment of the present application.

As shown in FIG. 7, in one embodiment, fixing blocks 310 are disposed on both inner side walls of the support member 300. In this embodiment, the fixing block 310 is provided to fix both sides of the device to be fixed 400 to further improve its stability. In one embodiment, each fixing block 310 is provided with an inclined surface, and the surfaces of the two fixing blocks 310 are arranged opposite to each other.

In this embodiment, an inclined surface is provided on the fixing block 310 in order to guide the device 400 to be fixed, and at the same time, the trigger portion 230 can be used to achieve the positioning effect, so that the device to be fixed can be in place at one time. Finally, it should be noted that the above embodiments are only used to illustrate the technical solution of the present application, rather than to limit it; although the present application is described in detail with reference to the above embodiments, ordinary technicians in this field should understand that they can still modify the technical solutions recorded in the above embodiments, or replace some or all of the technical features therein by equivalent; and these modifications or replacements do not make the essence of the corresponding technical solution deviate from the scope of the technical solution of each embodiment of the present application.

We claim:

1. A locking device, the locking device comprising:

a hook assembly including a sliding member, a first hook, a second hook and a base, the first hook and the second hook are arranged on the sliding member at intervals, the sliding member is slidably arranged on the base, and an adjustment assembly is arranged between the sliding member and the base;

wherein when a device to be fixed drives the first hook to drive the sliding member to move toward the second hook, the sliding member and the base move relative to each other, and at this time, the adjustment assembly drives the sliding member to move toward the device to be fixed, so that the device to be fixed is fixed by the first hook; and a trigger assembly including a trigger assembly body and a mounting member, wherein the trigger assembly body is arranged on the mounting member, and the mounting member is arranged on the base, the trigger assembly body is movably sleeved above the first hook, and the trigger assembly body is driven to move by the device to be fixed to limit the sliding piece.

2. The locking device of claim 1, wherein the adjustment assembly includes a first elastic member, the sliding member is provided with a first through hole, a groove is provided at a position corresponding to the first through hole on the base, and the first elastic member is provided in the first through hole and the groove.

3. The locking device of claim 2, wherein when the first hook is driven by the device to be fixed to drive the sliding member to move toward the second hook, an end of the first elastic member close to the first hook abuts against the sliding member and does not abut against the base; an end of the first elastic member away from the first hook does not abut against the sliding member, and abuts against the end of the base away from the first hook.

4. The locking device of claim 1, wherein the trigger assembly body comprises a trigger member and a movable member, the trigger member and the movable member are hinged, the mounting member is movably sleeved above the first hook, a second through hole is provided on the mounting member, the movable member is movably provided inside the second through hole, the movable member matches the second through hole, a second elastic member is provided on the periphery of the movable member, and the trigger member is driven by the device to be fixed to cause the second elastic member to undergo elastic deformation.

5. The locking device of claim 4, wherein a limit block is provided on a side of the first hook close to the second hook.

6. The locking device of claim 5, wherein the trigger member is driven to move by the device to be fixed, thereby driving the movable member to move until the limit block restricts the movable member from further moving.

7. The locking device of claim 6, wherein when the device to be fixed is not in contact with the trigger member, the second elastic member drives the movable member to reset the trigger member.

8. The locking device of claim 7, wherein the trigger member is a lever, and a movable angle of the lever on the upper end surface of the mounting member is less than 90 degrees.

9. The locking device of claim 1, wherein the first hook and the second hook are both provided with a trigger portion on a side facing the device to be fixed.

10. The locking device of claim 9, wherein the trigger portion is a beveled surface.

11. The locking device of claim 9, wherein the first hook and the second hook are both provided with an inverted L-shaped groove below the trigger portion, and when the device to be fixed is in a locked state, the member to be fixed is arranged in the inverted L-shaped groove.

12. The locking device of claim 11, wherein a shielding member is provided at the upper end of the trigger assembly body, and a notch is provided on the shielding member corresponding to the position of the L-shaped groove.

13. A locking device, the locking device comprising:

a hook assembly and a trigger assembly;

wherein the hook assembly comprising a sliding member, a first hook, a second hook and a base, the first hook and the second hook are spaced apart on the sliding member, the sliding member is slidably arranged on the base, and a spring is arranged between the sliding member and the base;

wherein when a device to be fixed drives the first hook toward the second hook, the sliding member and the base move relative to each other, and the spring drives the sliding member to move toward the device to be fixed, so that the device to be fixed is fixed by the first hook.

14. The locking device of claim 13, wherein the trigger assembly includes a trigger assembly body and a mounting member, wherein the trigger assembly body is arranged on the mounting member, and the mounting member is arranged on the base.

* * * * *